Oct. 5, 1965  H. W. BOOK  3,210,706
ELECTRICAL INDUCTIVE APPARATUS HAVING INTERLEAVED WINDINGS
FOR PROVIDING A PREDETERMINED CAPACITIVE EFFECT
Original Filed Feb. 13, 1962  2 Sheets-Sheet 1

WITNESSES:

INVENTOR
Herbert W. Book
BY
ATTORNEY

United States Patent Office 3,210,706
Patented Oct. 5, 1965

3,210,706
ELECTRICAL INDUCTIVE APPARATUS HAVING INTERLEAVED WINDINGS FOR PROVIDING A PREDETERMINED CAPACITIVE EFFECT
Herbert W. Book, Sharon, Pa., assignor to Westinghouse Electric Corporation, Pittsburgh, Pa., a corporation of Pennsylvania
Continuation of application Ser. No. 172,916, Feb. 13, 1962. This application Mar. 25, 1964, Ser. No. 356,002
10 Claims. (Cl. 336—183)

This application is a continuation of copending application, Serial No. 172,916, now abandoned, filed February 13, 1962, in the name of Herbert W. Book, and assigned to the same assignee as this application.

This invention relates to electrical inductive apparatus, such as transformers, and more particularly to the windings of such apparatus.

It is well known that the voltage drop across the effective impedance of a transformer applied in an electrical distribution system and the voltage drops across the feeder lines associated with such a transformer adversely affect the voltage regulation of the distribution system.

One conventional method which has been employed to improve the voltage regulation in a distribution system involves the use of voltage controlling equipment, such as tap-changing transformers, which include moving parts. This method has several disadvantages which include the problems relating to the maintenance of such equipment.

Another general method of improving voltage regulation in an electrical distribution system is disclosed in copending application Serial No. 745,555, now abandoned, filed June 30, 1958, by Arthur M. Lockie and in my copending application Serial No. 786,468, now abandoned filed January 13, 1959 which are both assigned to the same assignee as the present application. In the Lockie application, a winding construction is disclosed which provides a predetermined capacitance between the adjacent turns of the different windings of a transformer with the capacitance being effectively connected in parallel with one of the associated windings to assist in compensating for the lagging power factor reactive voltage drop due to the magnetizing component of the exciting current of the transformer. In my copending application just mentioned, a predetermined capacitance is provided between the different windings of a transformer and effectively connected in series with one of the windings of said transformer to compensate for at least a portion of the voltage drop across the overall impedance of said transformer and in certain applications to compensate for at least a portion of the voltage drop across an associated feeder line connected to said transformer in an electrical distribution system. The transformer constructions disclosed in thea bove-mentioned applications also provide other important advantages which relate to the voltage stress applied to the insulation between the windings, to the mechanical strength of the windings, and to the space factor of the transformer constructions. It should be noted, however, that the transformer constructions disclosed in the above-mentioned applications are more readily adapted to grounded distribution systems and the amount of capacitance provided between the windings of the disclosed transformer constructions is normally limited to the length of the dielectric or insulation which is common to both windings. It is therefore desirable to provide an improved transformer construction which provides all of the advantages of the transformer constructions disclosed in the above-mentioned applications, which is more readily adapted to all types of electrical distribution systems, both grounded and ungrounded, and in which the capacitance provided is not limited by the dielectric or insulation common to both windings of the transformer.

It is an object of this invention to provide a new and improved electrical inductive apparatus, such as a transformer.

Another object of this invention is to provide a predetermined capacitance between the different portions or sections of a winding of an electrical inductive apparatus, such as a transformer, the voltage drop across said capacitance varying with the current flow in said winding.

A further object of this invention is to provide a predetermined capacitance between the different portions or sections of a transformer winding with the capacitance being effectively connected in series with said winding.

A still further object of this invention is to provide a predetermined capacitance between the windings of a transformer and to provide an additional predetermined capacitance between the different portions or sections of one of said windings, the voltage drop across the latter capacitance varying with the current flow in the latter winding.

Other objects of the invention will, in part, be obvious and will, in part, appear hereinafter.

For a fuller understanding of the nature and objects of the invention, reference should be had to the following detailed description taken in connection with the accompanying drawing in which.

Figure 1:
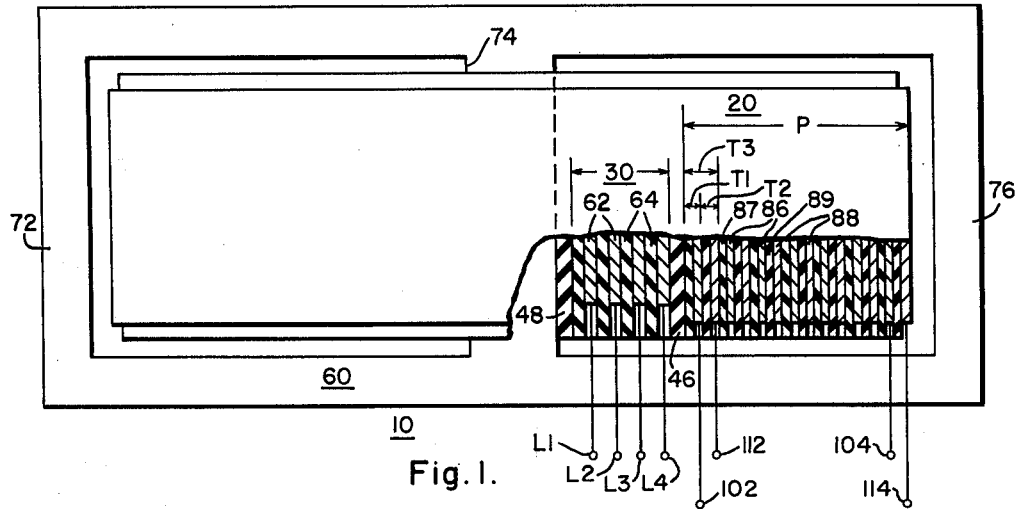
FIGURE 1 is a front elevational view, partly in section and partly schematic, of a transformer core and coil assembly illustrating a first embodiment of the invention.

Referring now to the drawings and FIG. 1 in particular, there is illustrated a transformer core and coil assembly 10 comprising a first or high voltage winding 20 and a second or low voltage winding 30 which are both inductively disposed on a magnetic core structure 60. Thus, the transformer has a ratio of transformation determined by the turns ratio of said windings in the conventional manner. As illustrated, the magnetic core 60 includes two substantially rectangular windows which are formed by the yoke portions of the magnetic core 60 and the first and second outer leg members 72 and 76, respectively, and a middle or winding leg member 74 on which the first and second windings 20 and 30, respectively, are inductively disposed. The winding leg member 74 is enclosed or surrounded by a supporting member, more specifically, a tube or barrier member 48 on which the first and second windings 20 and 30 respectively, are wound. The tube or barrier member 48 provides mechanical support for the first and second windings 20 and 30, respectively, and may be formed from electrically insulating material in certain applications to insulate said windings from the winding leg member 74 of the magnetic core 60. Although the magnetic core 60 is illustrated as being of the single phase shell form type, it is to be understood that the teachings of the invention may be incorporated in core and coil assemblies including magnetic cores of other types or configurations, such as those of the core form type.

Figure 2:
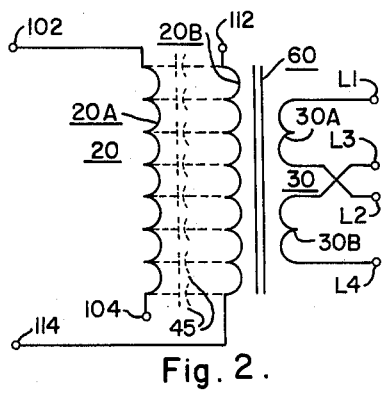
FIGS. 2, 3 and 4 are equivalent schematic diagrams of the windings of the transformer core and coil assembly shown in FIG. 1.

In particular, the first or high voltage winding 20 comprises the first and second winding portions or sections 20A and 20B, respectively, as best shown in FIGS. 1 and 2. The first winding section 20A of the winding 20 comprises a plurality of turns of a first layer of conducting sheet material 86 and a second layer of electrically insulating sheet material 87 which are generally spirally wound together about a portion of the magnetic core 60, more specifically the winding leg member 74. Similarly, the second winding section 20B of the winding 20 comprises a plurality of turns of a first layer of conducting sheet material 88 and a second layer of electrically insulating sheet material 89 which are generally spirally wound together about the same portion of the associated magnetic core 60. The widths of the insulating sheet or film materials 87 and 89 are preferably greater than the corresponding widths of the layers of conducting sheet or foil material 86 and 88, respectively, in order to provide additional "creep" insulation between the adjacent turns of the first winding 20. The conducting materials 86 and 88 and the insulating materials 87 and 89 are all of a general type in which the axial dimension of the materials is relatively large compared to the radial dimension. In other words, the width of each of the latter materials is relatively large compared to the thickness of each of said materials. Each turn of the first winding section 20A of the first winding 20, as indicated at T1, includes only a layer of the insulating material 87 and a layer of the conducting material 86, while each turn of the second winding section 20B includes only a layer of the insulating material 89 and a layer of the conducting material 88, as indicated at T2, with each layer of insulating material electrically insulating the adjacent layers of conducting materials from one another to provide the turn-to-turn insulation in the winding 20. It is to be understood, however, that in certain applications that a layer of electrically insulating material may be provided on each side of each layer of conducting sheet material which makes up each of the turns of each of the winding sections 20A and 20B of the winding 20 so that each turn of each of the winding sections 20A and 20B would include two layers of electrically insulating material and one layer of conducting sheet material.

As illustrated, the second winding 30 includes the first and second winding sections or portions 30A and 30B, respectively. Each of the winding sections 30A and 30B of the second winding 30 includes a plurality of turns of a layer of conducting sheet or strip material 62 and a layer of electrically insulating sheet material 64 which are generally spirally wound together about the winding leg member 74 of the magnetic core 60. Each turn of each of the winding sections 30A and 30B of the second winding 30 includes a layer of the insulating sheet or film material 64 and a layer of the conducting sheet or foil material 62. Similarly to the first winding 20 and for the same reasons, the width of the layer of insulating sheet material 64 of the second winding 30 is preferably greater than the width of the layer of conducting sheet material 62 which is included with the turns of each of the winding sections 30A and 30B.

In the assembly of the turns of the windings 20 and 30, the turns of the second winding 30 are first spirally wound in separate successive groups to form the winding sections 30A and 30B which are radially displaced with respect to one another, as best shown in FIG. 1. In particular, the turns of the first winding section 30A of the winding 30 which each include the layer of insulating sheet material 64 and the layer of conducting sheet material 62 are first wound on the tube or barrier member 48. Next, the turns of the second winding section 30B of the winding 30 which each include the layer of insulating sheet material 64 and the layer of conducting sheet material 62 are spirally wound around the first winding section 30A of the winding 30. The inner end or turn of the conducting sheet material 62 of the first winding section 30A of the winding 30 is connected to the terminal L1. The outer end or turn of the layer of conducting sheet material 62 of the first winding section 30A of the winding 30 is connected to the terminal L2. Similarly, the inner end or turn of the conducting sheet material 62 of the second winding section 30B of the winding 30 is connected to the terminal L3, while the outer end or turn of the layer of conducting material 62 of the second winding section 30B is connected to the terminal L4. The terminals L2 and L3 of the winding 30 may be electrically connected for a series connection of the winding sections 30A and 30B while the terminals L1 and L2 may be interconnected with the terminals L3 and L4, respectively, for a parallel connection of the winding sections 30A and 30B. It is to be understood that in certain applications the winding 30 may include one or more winding sections formed from conducting material having a shape or cross-sectional configuration other than the preferred conducting sheet material as illustrated.

In order to electrically insulate the second or low voltage winding 30 from the first or high voltage winding 20, the tubular insulating member 46 is next assembled around the outside of the second winding 30. The insulating member 46 may be conveniently formed by winding a plurality of superimposed turns of an insulating sheet material having substantially the same width as the insulating sheet material 64. It is important to note that in a transformer core and coil assembly as disclosed, that the first or high voltage winding 20 may be fully insulated electrically from the second or low voltage winding 30 by the insulating member 46 which provides the winding-to-winding insulation.

In the assembly of the winding 20, the turns of the first and second winding sections 20A and 20B, respectively, are wound simultaneously in the portion of the overall core and coil assembly 10 as indicated at P. Each turn of the combined first and second winding sections 20A and 20B, respectively, of the first winding 20 includes one layer of insulating sheet material 87, one layer of conducting sheet material 86, one layer of sheet material 89 and one layer of conducting sheet material 88 as indicated at T3 in FIG. 1. As described, the turns of the first winding section 20A of the winding 20 are wound simultaneously with at least a portion of the turns of the second winding section 20B of the winding 20 and continuously interleaved with the adjacent turns of the second winding section 20B in the portion of the core and coil assembly as indicated at P for a purpose which will be explained hereinafter. The turns of the first winding section 20A, therefore, start and stop at first and second predetermined turns respectively of the second winding section 20B of the first winding 20, the inner end turns of the first and second winding sections 20A and 20B, respectively being preferably disposed adjacent to one another for reasons which will be discussed hereinafter. In other words, the winding of the first or inner end turns of each of the first and second winding sections 20A and 20B of the winding 20 would preferably be started together or at the same time, as shown in FIG. 1, although the starting of the turns of the first winding section 20A may be delayed in certain applications.

Considering the connections of the first and second winding sections 20A and 20B, respectively, of the first winding 20 as shown in FIGS. 1 and 2, the inner end or turn of the conducting sheet material 86 of the first winding section 20A is connected to the terminal 102, while the outer end or turn of the layer of conducting sheet material 86 of the first winding section 20A is connected to the terminal 104. The inner end or turn of the layer of conducting sheet material 88 of the second winding section 20B of the winding 20 is connected to the terminal 112 while the outer end or turn of the layer of conducting material 88 is connected to the terminal 114. It is important to note that the outer end of the conducting sheet material 86 of the first winding section 20A as indicated at the terminal 104 and the inner end or turn of the conducting sheet material 88 of the second winding section 20B as indicated at the terminal 112 are not normally intended or adapted for direct external electrical connections to either an alternating current circuit or source (not shown) for reasons which will be discussed hereinafter.

Figure 3:
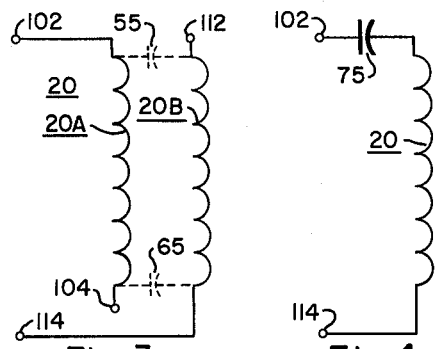
Figure 4:
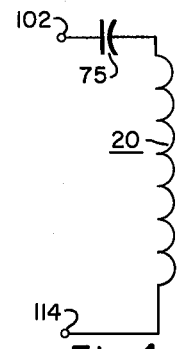

The manner in which the first winding section 20A and the second winding section 20B of the first winding 20 are disposed or arranged with the adjacent turns of the respective winding sections being continuously interleaved has several important results. As best shown in FIG. 2, there is illustrated an equivalent schematic diagram of the first and second windings 20 and 30, respectively, of the transformer core and coil assembly 10 shown in FIG. 1. Because of the insulating and conducting materials employed and the manner in which the turns of the first and second winding sections 20A and 20B, respectively, of the first or high voltage winding 20 are continuously interleaved, a predetermined capacitance of the distributed type, as indicated at 45 in FIG. 2, results between the adjacent turns of the first and second winding sections 20A and 20B, respectively. As shown in FIG. 2, only the inner end or turn of the conducting sheet material 86 which forms the turns of the first winding section 20A and the outer end or turn of the conducting sheet material 88 which forms the turns of the second winding section 20B are adapted for direct electrical connections to an external alternating current or source, as indicated at the terminals 102 and 114, respectively. The outer end of the conducting sheet material 86 which makes up the turns of the first winding section 20A as indicated at the terminal 104 and the inner end of the conducting sheet material 88 which makes up the turns of the second winding section 20B, as indicated at the terminal 112, are not adapted for physical or direct electrical connections to an external circuit but are merely left unconnected or "floating." The winding section 30A of the second winding 30 is connected across the terminals L1 and L2 which are connected to the inner and outer ends, respectively, of the winding section 30A. The winding section 30B of the second winding 30 is similarly connected across the terminals L3 and L4 which are connected to the inner and outer ends, respectively, of the winding section 30B. The terminals 102 and 114 of the first or high voltage winding 20 would normally be connected to an external alternating current circuit source or circuit (not shown) and the terminals L1 through L4 of the second winding 30 would be connected in a series or parallel arrangement of the winding portions 30A and 30B to a second alternating circuit or load circuit (not shown). It is important to note that the second winding section 20B of the first or high voltage winding 20 is adapted to be energized substantially entirely through the first winding section 20A of the winding 20 and the distributed capacitance 45 since any load current flowing from the first alternating current circuit connected at the terminals 102 and 114 would have to flow through a network formed by the combined turns of the first and second winding sections 20A and 20B, respectively, of the first winding 20, as indicated at P in FIG. 1, and the distributed capacitance 45. Hence the current through the distributed capacitance 45 varies with or is dependent upon the current which flows to a load (not shown) connected across the second winding 30 at the terminals L1 through L4. When a potential is applied between the terminals 102 and 114, an equivalent schematic diagram of the first or high voltage winding 20 may be represented on a lumped equivalent basis as shown in FIG. 3. The effect of the distributed capacitance 45 between the adjacent turns of the first and second winding sections 20A and 20B respectively of the first winding 20 may be represented as first and second effective lumped capacitances 55 and 65, respectively, as shown in FIG. 3 which are effectively connected between the inner ends and the outer ends, respectively, of the first and second winding sections 20A and 20B, respectively, of the first winding 20 through each of which approximately one-half the total load current may be considered to flow. An alternate equivalent lumped schematic diagram of the first winding 20 is shown in FIG. 4 in which the effect of the distributed capacitance 45 shown in FIG. 2 is represented as a single lumped capacitance 75 which is effectively connected in series with the first winding 20, the series circuit being connected between the terminals 102 and 114 to a first alternating current circuit or source (not shown).

The effective value of the predetermined capacitance 45 provided between the adjacent turns of the first and second winding sections, 20A and 20B, respectively, of the winding 20 varies with several important factors. First, the capacitance 45 varies with the effective areas of the turns of the layers of conducting material 86 and 88 included in the first and second winding sections 20A and 20B, respectively, considered as electrodes. The capacitance 45 also varies with the dielectric constant, the thickness, and the effective areas of the layers of insulating sheet material 87 and 89 included with the first and second winding sections 20A and 20B, respectively, considered as dielectric materials. Since the number of turns included in the first or high voltage winding 20 is normally much greater than the number of turns included in the second or low voltage winding 30, the required value of capacitance 45 can be much more easily obtained than for the same value of capacitance provided between the adjacent turns of the first and second windings 20 and 30, respectively, as provided in the copending applications previously mentioned by simply varying the number of turns included in the first winding section 20A of the first or high voltage winding 20 and thereby varying the effective length and area of the insulating sheet material which is common to the turns of the first and second winding sections 20A and 20B, respectively, of the first or high voltage winding 20.

In general, in the operation of the core and coil assembly 10, the capacitance 45 provided between the adjacent turns of the first and second winding sections 20A and 20B can be designed to compensate for at least a portion of the voltage drop across the overall impedance of said transformer core and coil assembly and even to compensate for a portion of the voltage drop in an associated feeder line connected between said core and coil assembly and a load. More specifically, the compensating effect of the capacitance 45 as a reactance varies with the square of the potential applied across the insulation between the first and second winding sections 20A and 20B, respectively, of the winding 20 considered as a dielectric material. It is important to note that when the turns of the first and second winding sections 20A and 20B respectively are continuously interleaved as shown in FIG. 1, the potential difference or stress across the insulation or dielectric material between the adjacent turns of said winding sections is substantially uniform. This is because when an alternating current potential is applied between the terminals 102 and 114 the potential will distribute itself substantially uniformly with respect to the turns of each of the first and second winding sections 20A and 20B, respectively, in the distributed network formed with the capacitance 45. When the winding of the inner end turns of each of the first and second winding sections 20A and 20B respectively is started together, the voltage stress across the insulation between the adjacent turns of said winding sections, considered as a dielectric, will be substantially negligible when no current is flowing to a load connected to the second winding 30. The voltage stress between the adjacent successive turns of the respective winding sections, as additional turns are added or wound, will remain at substantially negligible value under no-load conditions since the potential applied at the terminals 102 and 114 distributes itself in a substantially uniform manner across the turns of each of said winding sections. When a load circuit is connected to the second winding 30 at the terminals L1 through L4 and load current begins to flow in the second winding 30 and the first winding 20, the voltage stress across the insulation between the adjacent turns of the first and second winding sections 20A and 20B, respectively, of the first winding 20 will increase with the load current to thereby provide a capacitance effect which is equivalent to a capacitance connected in series with the first winding 20, as shown schematically in FIG. 4. Since the electrical insulation provided between the adjacent turns of the first and second winding sections 20A and 20B is of a substantial uniform thickness, the substantially uniform voltage stress across the latter insulation results in a more efficient utilization of the insulation as compared to a conventional transformer in which the voltage stress applied to the corresponding insulation is normally of a non-uniform type.

Figure 2A:
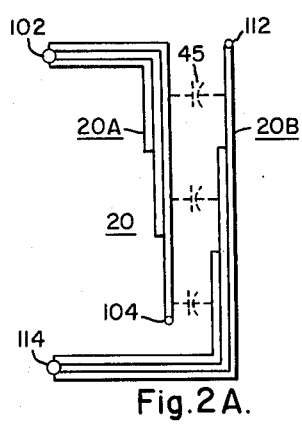
FIG. 2A illustrates functionally, a modification which may be made to transformer coil shown in FIG. 1.

It is to be noted that if the cross-sectional area of the conducting sheet materials 86 and 88 which form the turns of the first and second winding sections 20A and 20B respectively were uniform throughout each of said winding sections, then the current density in the conducting sheet materials which make up the turns of the winding sections 20A and 20B will vary from maximum values at the ends of said winding sections which are adapted for external connections to minimum values at the ends of the respective winding sections which are unconnected or not adapted for external connections. For example, in the winding section 20A, if the cross-sectional area of the conducting sheet material 86 were uniform for all of the turns of said winding section, then the current in the turns of said winding section would vary from a maximum value at the inner end of said winding section which is substantially equal to the line current from the terminal 102 to a minimum value at the outer end or turn of the winding section 20A at the terminal 104. In order to provide a more uniform current density throughout the turns of each of the winding sections 20A and 20B, the number of layers of conducting sheet material which make up the turns of the respective winding sections may be varied in steps during the winding of said winding sections to more nearly correspond to the current flow which results in the different portions of each of said winding sections. For example, as shown in FIG. 2A, in the winding section 20A, the first third of the turns of the winding section 20A at the inner end of said winding section could be wound with three layers of conducting sheet material of a particular thickness, the second third of the turns of the winding section 20A could be wound with two layers of conducting sheet material of the particular thickness and the last third of the turns of the winding section 20A at the outer end thereof could be wound with a single layer of conducting sheet material of a particular thickness to achieve a current density in said winding section which is more nearly uniform or balanced throughout the winding section. The winding section 20B could be similarly modified with the larger number of layers of conducting sheet material being disposed in the outer portion of turns since the outer end of the winding section 20B is the one adapted for the external connection to the terminal 114 with the number of layers successively decreasing in steps toward the inner end of the winding section 20B.

Figure 5:
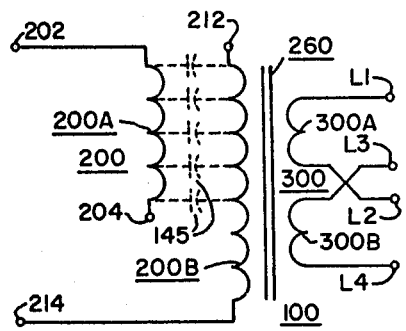
FIG. 5 is an equivalent schematic diagram illustrating a modified form of the transformer core and coil assembly shown in FIG. 1.

Referring now to FIG. 5, there is illustrated a modified core and coil assembly 100 which is similar to the core and coil assembly 10 except that one of the winding sections which makes up the first winding 200 includes a lesser number of turns than the other winding section of the first winding 200. The second winding 300 includes the first and second winding sections 300A and 300B, respectively, and is identical to the first winding 30 of the core and coil assembly 10 previously described. As shown schematically in FIG. 5, the first winding section 200A of the first or high voltage winding 200 includes a smaller number of turns than the second winding section 200B of the winding 200 to provide the required capacitance 145 between the adjacent turns of said winding sections where the required capacitance is less than that which would result for an equal number of turns in both of said winding sections as in the core and coil assembly 10. The conducting sheet materials and insulating sheet materials of the core and coil assembly 300 would be similar to those shown in detail in FIG. 1 for the core and coil assembly 10. The starting turns of each of the winding sections 200A and 200B would be adjacent to one another at the inner ends of the respective winding sections similarly to those of the winding sections 20A and 20B of the winding 20 previously described, but the turns of the first winding section 200A would be stopped at a second predetermined turn of the second winding section 200B after the desired value of capacitance is achieved in the winding 200. The inner end only of the first winding section 200A would be adapted for direct electrical connection to the terminal 202, while the outer end or turn of the conducting sheet material which makes up the turns of the first winding section 200A would be left unconnected or "floating" similarly to the outer end of the first winding section 20A of the winding 20 previously described. The inner end of the second winding section 200B would be left unconnected or "floating," while the outer end of the second winding section 200B would be adapted for direct electrical connection to the terminal 214. The operative effect of the capacitance 145 provided between the adjacent turns of the first and second winding sections 200A and 200B, respectively, would be that of a capacitance connected in series with the first winding 200 since the voltage drop across said capacitance would vary with the current flowing to a load connected to the second winding 300 similarly to the core and coil assembly previously described.

Figure 6:
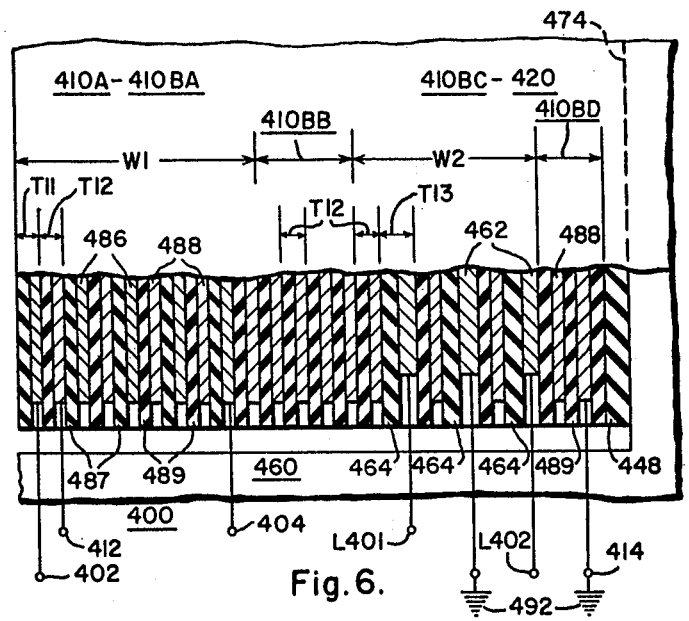
FIG. 6 is a partial front elevational view, partly in section and partly schematic, of a transformer core and coil assembly illustrating a second embodiment of the invention.

Referring now to FIG. 6, there is shown a core and coil assembly 400 illustrating a second embodiment of the invention. The core and coil assembly 400 comprises the first or high voltage winding 410 and the second or low voltage winding 420 which are both inductively disposed on a magnetic core 460 having a middle or winding leg member 474 which is similar to the magnetic core 60 of the core and coil assembly 10. In general the core and coil assembly 400 is similar to the core and coil assembly 10 previously described except that the core and coil assembly 400 additionally provides a predetermined capacitance between the adjacent turns of the first and second windings 410 and 420, respectively, which is effectively connected in parallel or shunt with at least a portion of the first winding 410.

More specifically, the first or high voltage winding 410 includes the first and second winding sections 410A and 410B, respectively. The second winding section 410B of the first winding 410 includes the first, second, third and fourth winding portions 410BA, 410BB, 410BC and 410BD, respectively, as best shown schematically in FIG. 7. The first and second windings 410 and 420 respectively are supported by the tube or barrier member 448 which may be formed from an electrically insulating material to insulate said windings from the magnetic core 460 similarly to the tube or barrier member 48 of the core and coil assembly 10.

The second winding section 410B of the first winding 410 comprises a plurality of turns of a first layer of conducting sheet foil material 488 and a second layer of electrically insulating sheet of film material 489 which are spirally wound together about the winding leg member 474 of the magnetic core structure 460. The first winding section 410A of the first winding 410 similarly comprises a plurality of turns of a first layer of conducting sheet or foil material 486 and a second layer of electrically insulating sheet or film material 487 with the turns of said first winding section being spirally wound with and continuously interleaved with only a portion of the turns of the second winding section 410B at the outer end of said second winding section to provide a predetermined distributed capacitance between the adjacent turns of said first and second winding sections, as indicated at 432 in FIG. 7. The widths of the insulating sheet materials included in the turns of the winding sections 410A and 410B are preferably greater than the corresponding widths of the associated conducting sheet materials for the same reasons previously discussed in connection with the core and coil assembly 10.

The second winding 420 also includes a plurality of turns of a first layer of conducting sheet or foil material 462 and a second layer of electrically insulating sheet or film material 464 with the turns of the second winding 420 being spirally wound with and continuously interleaved with only a portion of the turns of the second winding section 410B of the first winding 410. It is to be noted that the turns of the second winding 420 are disposed relatively closer to the inner end of the second winding section 410B and are radially displaced from the turns of the first winding section 410A of the first winding 410. Due to the continuous interleaving of the adjacent turns of the adjacent winding 420 and the turns of the second winding section 410B of the first winding 410, a predetermined distributed capacitance results between the adjacent turns of said first and second windings as indicated schematically at 434 in FIG. 7.

Figure 7:
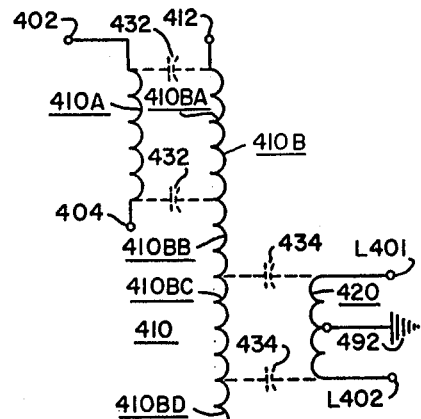
FIGS. 7 and 8 are equivalent schematic diagrams of the transformer core and coil assembly shown in FIG. 6.

In the manufacture or assembly of the first and second windings 410 and 420 respectively, the innermost turns of the second winding section 410B, as indicated at 410BD, are first wound on the supporting member 448 with each turn including one layer of the conducting sheet material 488 and one layer of the insulating sheet material 489. During the next portion of the winding of the core and coil assembly 400, as indicated at W2, the winding of the turns of the second winding section 410B and the turns of the second winding 420 proceeds simultaneously, with each turn of the second winding section including one layer of the conducting sheet material 488 and one layer of the insulating sheet material 489, as indicated at T12 in FIG. 6, and each turn of the second winding 420 including one layer of the conducting sheet 462 and one layer of the insulating sheet material 464, as indiacted at T13 in FIG. 6. It is to be noted that the turns of the second winding 420 start and stop at first and second predetermined turns of the second winding section 410B. During the winding of the next portion of the first winding 410, more specifically of the second winding section 410B of the first winding 410, as indicated at 410BB in the core and coil assembly 400, each turn includes only one layer of the conducting sheet material 488 and one layer of the insulating sheet material 489, as indicated at T12 in FIG. 6. During the winding of the final or outermost portion of the turns of the second winding section 410B, the turns of the first winding section 410A and the turns of the second winding section 410B are wound simultaneously in the portion of the core and coil assembly 400 indicated at W1. The combined turns of the first winding section 410 and the turns of the outermost portion of the second winding section 410B as indicated at 410BA include one layer of the insulating sheet material 487 and one layer of the conducting sheet material 486, as indicated at T11, and one layer of the conducting sheet material 488 and one layer of the insulating sheet material 489, as indicated at T12 in FIG. 6. It is also to be noted that the turns of the first winding section 410A start and stop at first and second predetermined turns, respectively, of the second winding section 410B, as best shown in FIGS. 6 and 7. Considering the connections of the first and second windings 410 and 420, respectively, the outer end or turn of the conducting sheet material which makes up the first winding section 410A is the only end or turn adapted for direct electrical connection to an external alternating current circuit as indicated at the terminal 402 while the inner end or turn of the conducting sheet material which makes up the turns of the first winding section 410 is left unconnected or "floating" and is not adapted for an external electrical connection. On the other hand, the inner end or turn only of the conducting sheet material which makes up the turns of the second winding section 410B is adapted for direct electrical connection to an external source or alternating current circuit, as indicated at terminal 414, which in turn is connected to ground as indicated at 492, while the outer end or turn of the conducting sheet material which makes up the turns of the second winding section 410B is left unconnected or "floating" and is not adapted for a direct electrical connection to an external alternating current circuit. The outer and inner ends or turns of the conducting sheet material which makes up the turns of the second winding 420 are adapted for direct electrical connections to an external alternating current circuit as indicated at the terminals L401 and L402, respectively, while the mid-point of the second winding 420 is connected to the ground indicated at 492. It is important to note that one point of the second winding section 410B, more specifically the inner end or turn thereof, is connected to the same common point as is one turn of the second winding 420, as indicated by the ground 492, in order to provide a charging path for the predetermined capacitance 434 which is disposed or provided between the adjacent turns of the first and second windings 410 and 420, respectively.

Figure 8:
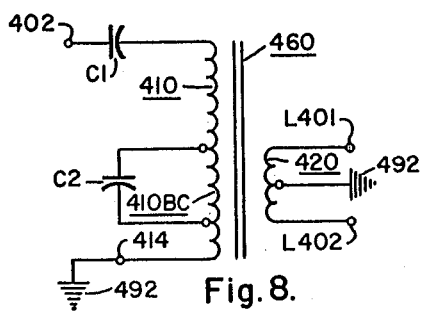

In the operation of the core and coil assembly 400 which is shown in a lumped equivalent schematic diagram in FIG. 8, the voltage drop across the predetermined capacitance 432 varies with the current flow in the first winding 410 when a potential is applied at the line terminals 402 and 414 of the first winding 410 and the predetermined capacitance between the adjacent turns of the first and second winding sections 410A and 410B, respectively, is effectively connected in series with the first winding 410 as indicated at C1 in FIG. 8. It is to be noted that the potential applied to the capacitance provided between the adjacent turns of the first and second winding sections 410A and 410B, respectively, when an alternating current potential is applied at the terminals 402 and 414 will be higher than the potential applied to the predetermined capacitance between the adjacent turns of the winding sections of the core and coil assembly 10 since the winding of the turns of the first winding section 410A is delayed compared to the starting of the innermost turns of the second winding section 410B for the same applied alternating current potential at the terminals 402 and 414. Since the voltage drop across the predetermined capacitance 434 provided between the adjacent turns of the first and second windings 410 and 420 respectively remains substantially constant and independent of variations in the load current which flows to any load connected at the terminals L401 and L402 of the second winding 420, the predetermined capacitance between the first and second windings 410 and 420, respectively, may be represented as a shunt or parallel capacitance as indicated at C2 in FIG. 8 which is effectively connected in parallel with a portion of the first winding 410 as indicated at 410BC.

In a typical application of the core and coil assembly 400, an alternating current circuit or source would be connected to the terminals 402 and 414 and a load circuit would be connected at the terminals L401 and L402 of the second winding 420. Since the compensating effect provided by the series capacitance C1 when no load current is flowing to a load connected across the second winding 420 is negligible, the compensating effect of the shunt or parallel capacitance C2 may be arranged to compensate for the reactive portion of the exciting current of the transformer core and coil assembly 400, while the voltage drop across the series capacitance C1 may be arranged to compensate for at least a portion of the voltage drop across the overall impedance of the core and coil assembly 400 when load current begins to flow to a load connected across the second winding 420 and possibly to compensate for a portion of the voltage drop across a feeder line connected between the second winding 420 and a load circuit connected to said second winding. It is important to note that the voltage stress across the insulation between the adjacent turns of the first and second winding sections 410A and 410B, respectively, and between the adjacent turns of the first and second windings 410 and 420, respectively, is substantially uniform in each case.

It is to be understood that other forms of electrical inductive apparatus incorporating the teachings of the invention may be provided with different arrangements of the insulation between the turns of the respective windings. For example, instead of using separate layers of sheet or film insulation between the turns of conducting sheet material, the layers of conducting sheet material may be coated with an insulating material, such as enamel, and the edges of the turns of the respective windings could be coated with other suitable electrically insulating materials, such as resins, to provide insulation between the turns of the respective windings, between the turns of the individual windings or winding sections or between said windings and the core structure or ground. It is also to be understood that in different embodiments of the invention disclosed that a plurality of layers of conducting sheet material may be provided in different portions of the winding structures disclosed to vary the current handling capacity of the different portions of the windings in accordance with the variations in current flow which result in the different core and coil assemblies.

The apparatus embodying the teachings of this invention has several advantages. For example, the constructions disclosed provide many of the advantages of the constructions disclosed in copending applications Serial No. 745,555 and Serial No. 786,468 with respect to the reduction of exciting current and the associated losses, with respect to the reduced lagging power factor reactive component of the impedance of a transformer and with respect to improved mechanical strength and space factor of the transformer. In addition, the applicant's disclosed construction permits a greatly increased value of predetermined capacitance while still permitting full electrical insulation between the respective windings of a transformer and application of the transformer on electrical distribution systems which are either grounded or ungrounded. Another advantage provided by the transformer core and coil assembly disclosed is that improvement in voltage regulation is obtained by static means which includes no moving parts such as are employed in conventional voltage controlling equipment. It is also important to note that the compensation provided by the disclosed construction is responsive to the load current being carried by the transformer to provide a continuous stepless improvement in voltage regulation of the distribution system in which the transformers are employed.

Since numerous changes may be made in the above-described apparatus and different embodiments of the invention may be made without departing from the spirit and scope thereof, it is intended that all matter contained in the foregoing description or shown in the accompanying drawings should be interpreted as illustrative and not in a limiting sense.

I claim as my invention:

1. An electrical transformer comprising a first winding including first and second winding sections, said first and second winding sections each including a plurality of turns of electrical conductive sheet material, the turns of said first winding section being continuously interleaved with at least a portion of the turns of said second winding section to provide a predetermined capacitance between said winding sections, insulating means disposed between the turns of said first and second winding sections, only one end of each of said first and second winding sections being adapted for connection to an external circuit, and a second winding disposed in inductive relation with said first winding, said capacitance being effectively connected in series with said first winding when said first and second winding sections are connected to an external circuit, to provide a voltage drop across said capacitance which varies with the current flow through the first and second winding sections of said first winding, said transformer being capable of transforming voltage dependent upon the ratio of turns in said first and second windings.

2. An electrical transformer comprising a magnetic core, a first winding including first and second winding sections disposed in inductive relation with said magnetic core, said first and second winding sections each including a plurality of turns of electrically conductive sheet material, the turns of said first winding section being continuously interleaved with at least a portion of the turns of said second winding section to provide a predetermined capacitance between said winding sections insulating means disposed between the turns of said first and second winding sections, and a second winding disposed in inductive relation with said magnetic core, said second winding including a plurality of turns of electrically conductive sheet material, said first and second winding sections of said first winding each having a single terminal adapted for connection to an external electrical circuit to effectively connect said capacitance in series with said first winding and provide a voltage drop across said capacitance which varies with the current flow through the first and second winding sections of said first winding, said transformer being capable of transforming voltage dependent upon the ratio of turns in said first and second windings.

3. A transformer comprising a magnetic core, first and second windings having turns disposed in inductive relation with said magnetic core, said first winding comprising first and second winding sections each including a plurality of turns of electrically conductive sheet material, the turns of said first winding section being continuously interleaved with at least a portion of the turns of said second winding section to provide a predetermined capacitance between said first and second winding sections, insulating means disposed between the turns of said first and second winding sections, one end only of the electrically conductive sheet material of the turns of said first winding section and one end only of the electrically conductive sheet material of the turns of said second winding section being adapted for external connections to an alternating current circuit, to effectively connect said predetermined capacitance in series circuit relation with said first winding, said transformer being capable of transforming voltage dependent upon the ratio of turns in said first and second windings.

4. A transformer comprising a magnetic core, first and second windings having turns disposed in inductive relation with said magnetic core, said first winding comprising first and second winding sections each including a plurality of turns of electrically conductive sheet material having electrical insulating material on at least one side thereof, the turns of said first winding section being continuously interleaved with and insulated from at least a portion of the turns of said second winding section to provide a predetermined capacitance between said first and second winding sections, only one end of the electrically conductive sheet material of the turns of said first winding section and only one end of the electrically conductive sheet material of the turns of said second winding section being adapted for external connections to an alternating current circuit, to effectively connect said capacitance in series with said first winding, said second winding comprising a plurality of spirally wound turns of electrically conductive sheet material, said transformer being capable of transforming voltage dependent upon the ratio of turns in said first and second windings.

5. A transformer comprising a magnetic core, a first winding including first and second winding sections, a second winding, said first and second windings being disposed in inductive relation with said magnetic core, said first and winding sections each including a plurality of turns of electrically conductive sheet material, the turns of said first winding section being continuously interleaved with at least a portion of the turns of said second winding section to provide a predetermined capacitance between said first and second winding sections, insulating means disposed between the turns of said first and second winding sections, said first and second winding sections each having only one end adapted for connection to an external electrical circuit, to effectively connect said capacitance in series with said first winding, the cross-sectional area of the electrically conductive sheet material of the turns of said first and second winding sections each varying, from a maximum at the end adapted for connection to an external electrical circuit to a minimum at the opposite end, to obtain a substantially uniform current density throughout the turns of said first and second winding sections when energized, said transformer being capable of transforming voltage dependent upon the ratio of turns in said first and second windings.

6. A transformer for connection to a source of alternating potential and a load circuit, comprising a magnetic core, a first winding including first and second winding sections, a second winding, said first and second windings being disposed in inductive relation with said magnetic core, said first and second winding sections each including a plurality of turns of electrically conductive sheet material, the turns of said first winding section being wound with and continuously interleaved with and electrically insulated from at least a portion of the turns of said second winding section to provide a predetermined capacitance between said first and second winding sections, said first and second winding sections each having a terminal adapted for connection to the source of alternating potential to effectively connect said capacitance in series with said first winding, the cross-sectional area of the electrically conductive sheet material of the turns of said first and second winding sections each varying in steps from a maximum at the terminal to a minimum at the other end of the winding section to obtain a substantially uniform current density throughout the turns of said first and second winding sections when energized, said transformer being capable of transforming voltage dependent upon the ratio of turns in said first and second windings.

7. A transformer comprising a magnetic core, first and second windings inductively disposed on said core, said first winding comprising first and second winding sections, said first winding section including a plurality of turns of electrically conductive sheet material and insulating means disposed in inductive relation with said magnetic core, said second winding section comprising a plurality of turns of electrically conductive sheet material and insulating means, the turns of said first winding section being continuously interleaved with a portion of the turns of said second winding section to provide a predetermined first capacitance between said first and second winding sections, said second winding comprising a plurality of turns of electrically conductive sheet material and insulating material, the turns of said second winding being continuously interleaved with a portion of the turns of said second winding section to provide a predetermined second capacitance between said first and second windings, only one end of each of said first and second winding sections being adapted for external connections to effectively connect said first capacitance in series with said first winding and provide energization of said second winding section through said first winding section and said first capacitance, said second winding section being electrically connected to said second winding to provide a charging path for said second capacitance and effectively connect said capacitance in parallel with certain turns of said first winding, said transformer being capable of transforming voltage dependent upon the ratio of turns in said first and second windings.

8. A transformer comprising a first winding, said first winding including first and second winding sections, a second winding disposed in inductive relation with said first winding, said first and second winding sections each including a plurality of turns of electrically conductive sheet material and insulating means, a portion of the turns of said second winding section being continuously interleaved with at least a portion of the turns of said first winding section to provide a first predetermined capacitance between said first and second winding sections, said first and second winding sections each having one end adapted for connection to an external electrical circuit to effectively connect said first capacitance in series with said first winding, said second winding comprising a plurality of turns of electrically conductive sheet material and insulating means, the turns of said second winding being continuously interleaved with a portion of the turns of said second winding section which are radially displaced from the turns of said first winding section, to provide a second predetermined capacitance between said first and second windings, said second winding section and said second winding being connected to a common point to effectively connect said second capacitance in parallel with certain turns of said first winding, said transformer being capable of transforming voltage dependent upon the ratio of turns in said first and second windings.

9. A transformer comprising a first winding, said first winding including first and second winding sections, a second winding disposed in inductive relation with said first winding, said first and second winding sections each including a plurality of turns of electrically conductive sheet material and insulating means, a portion of the turns of said second winding section being continuously interleaved with the turns of said first winding section to provide a first predetermined capacitance between said first and second winding sections, said first and second winding sections each having only one end adapted for connection to an external circuit to effectively connect said first capacitance in series with said first winding, said second winding comprising a plurality of turns of electrically conductive sheet material and insulating means, the turns of said second winding being continuously interleaved with a portion of the turns of said second winding section which are radially displaced from the turns of said first winding section to provide a second predetermined capacitance between said first and second windings, said second winding and said second winding section being connected to a common point to effectively connect said second capacitance in parallel with certain turns of said first winding, the cross-sectional area of the electrically conductive sheet material of the turns of said first and second winding sections each varying from a maximum at the end adapted for connection to an external electrical circuit to a minimum at the opposite end, to obtain a substantially uniform current density throughout the turns of said first and second winding sections when energized, said transformer being capable of transforming voltage dependent upon the ratio of turns in said first and second windings.

10. A transformer comprising a magnetic core, a first winding including first and second winding sections disposed in inductive relation with said magnetic core, a second winding disposed in inductive relation with said magnetic core, and said first and second winding sections each including a plurality of turns of electrically conductive sheet material and electrical insulating means, the turns of said first winding section being continuously interleaved with a portion of the turns of said second winding section at an outer end thereof to provide a first predetermined capacitance between said first and second winding sections, only one end of each of said first and second winding sections being adapted for external electrical connections to an alternating current circuit to effectively connect said first capacitance in series with said first winding, said second winding comprising a plurality of turns of electrically conductive sheet material and insulating means, the turns of said second winding being continuously interleaved with a portion of the turns of said second winding section which is relatively closer to the inner end of said second winding section to provide a second predetermined capacitance between said first and second windings, said second winding section and said second winding being connected to a common point to provide a charging path for said second predetermined capacitance and effectively connect said second capacitance in parallel with certain turns of said first winding, said transformer being capable of transforming voltage dependent upon the ratio of turns in said first and second windings.

References Cited by the Examiner

UNITED STATES PATENTS

| | | | |
|---|---|---|---|
| 854,774 | 5/07 | Taylor | 336—223 |
| 1,752,873 | 4/30 | Zelt | 336—150 X |
| 2,521,513 | 9/50 | Gray | 336—165 X |
| 2,998,583 | 8/61 | Worcester | 336—206 X |
| 3,068,433 | 12/62 | Wroblewski et al. | 336—223 X |
| 3,078,411 | 2/63 | Book | 336—69 X |

FOREIGN PATENTS

| | | |
|---|---|---|
| 1,261,940 | 4/61 | France. |
| 872,073 | 7/61 | Great Britain. |
| 550,963 | 11/56 | Italy. |

JOHN F. BURNS, *Primary Examiner.*